United States Patent [19]

Auzolat

[11] Patent Number: 4,497,084
[45] Date of Patent: Feb. 5, 1985

[54] WINDSCREEN-WIPER ELEMENT COMPRISING A WINDSCREEN-WIPER ARM SUBJECTED TO THE ACTION OF A COMPRESSION SPRING BY MEANS OF A STOP BRACKET

[75] Inventor: Jean Auzolat, Paris, France

[73] Assignee: Equipements Automobiles Marchal, Issy-les-Moulineaux, France

[21] Appl. No.: 482,996

[22] PCT Filed: Dec. 9, 1982

[86] PCT No.: PCT/FR82/00206
§ 371 Date: Mar. 31, 1983
§ 102(e) Date: Mar. 31, 1983

[87] PCT Pub. No.: WO83/02094
PCT Pub. Date: Jun. 23, 1983

[30] Foreign Application Priority Data
Dec. 11, 1981 [FR] France .................. 81 23200

[51] Int. Cl.³ .............................. B60S 1/40
[52] U.S. Cl. .................. 15/250.34; 15/250.35
[58] Field of Search ........... 15/250.31, 250.32, 250.34, 15/250.35, 250.19, 250.20

[56] References Cited
U.S. PATENT DOCUMENTS
2,799,039 7/1957 Oishei .
3,176,336 4/1965 Scinta .
3,427,676 2/1969 Riester .............................. 15/250.34

FOREIGN PATENT DOCUMENTS
1078461 3/1960 Fed. Rep. of Germany .
535852 11/1955 Italy ................................. 15/250.34

Primary Examiner—Peter Feldman
Attorney, Agent, or Firm—Brisebois & Kruger

[57] ABSTRACT

The invention relates to a windscreen-wiper element comprising a windscreen-wiper arm (1) and a head (2) fixed on a drive shaft; a compression spring (14) is interposed between a member (10) connected to the head (2) and a bracket (5) encased in the casing (3); the member (10) is articulated on the head (2) and is constituted by a plate perpendicular to the said articulation shaft, the said plate comprising a recess for the accommodation of a spring (14) and being connected to the casing (3) by a sliding connection. The bracket (5) bears by means of the edges of its first element (5a) on the projections (50) provided on the flanges (3a) of the casing (3) and its second element (5b) is accommodated between the web (3b) of the casing (3) and the above-mentioned projections (50). This windscreen-wiper element may in particular be used for heavy vehicles.

20 Claims, 4 Drawing Figures

U.S. Patent  Feb. 5, 1985  4,497,084
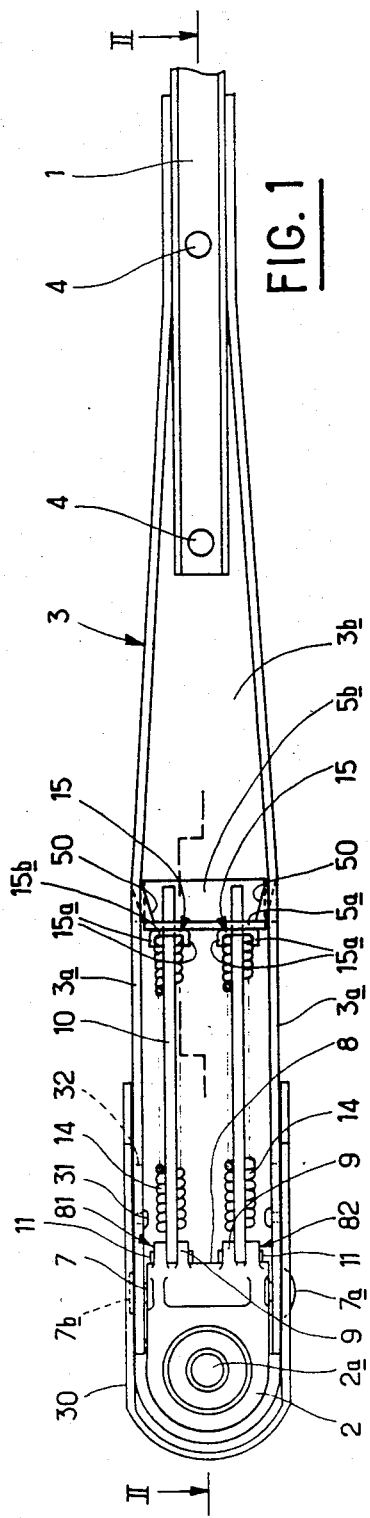
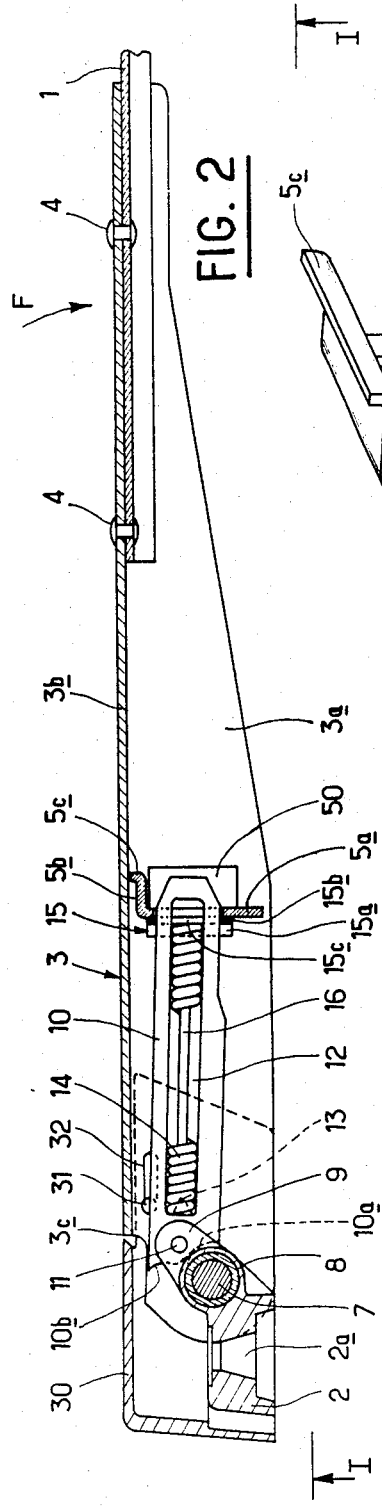
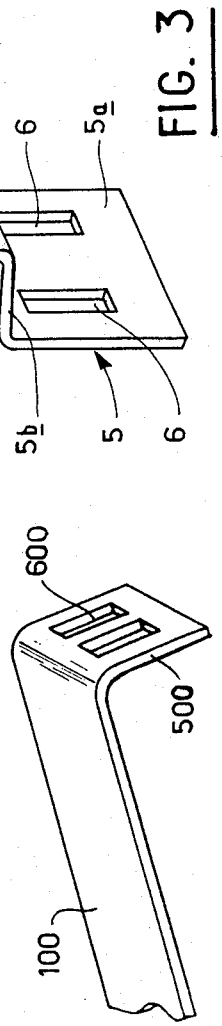
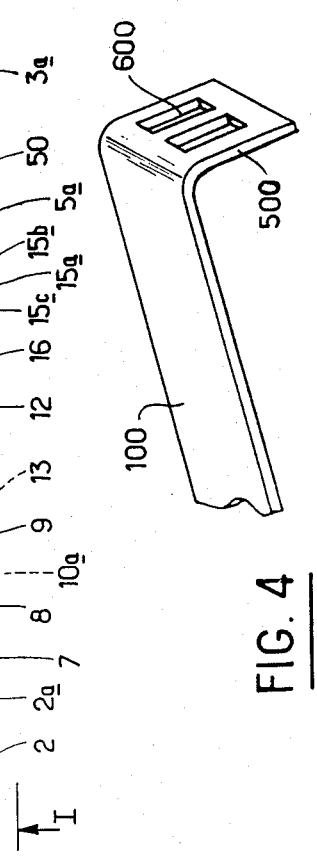

WINDSCREEN-WIPER ELEMENT COMPRISING A WINDSCREEN-WIPER ARM SUBJECTED TO THE ACTION OF A COMPRESSION SPRING BY MEANS OF A STOP BRACKET

The present invention relates to windscreen-wipers, in particular for motor vehicles.

It is known that glazed surfaces which have been sprayed have to be subjected to the action of windscreen-wipers, which generally have an alternate wiping movement, when it is desired to maintain good visibility through the said surfaces. The action of the windscreen-wipers on the surface to be wiped is performed by means of a windscreen-wiper blade driven by a motor mechanism by means of a windscreen-wiper element ensuring the mechanical connection between the windscreen-wiper blade and the drive mechanism. More specifically, the drive mechanism comprises a rotating shaft on which there is mounted an assembly head articulated by a cylindrical articulation with respect to a casing rigid with a windscreen-wiper arm. A resilient system is interposed between the casing and the above head so as to maintain a resilient bearing of the windscreen-wiper blade on the surface to be wiped when the windscreen-wiper is in operation.

In the French patent application 79-19195 filed on 25th July 1979 there is disclosed a windscreen-wiper element in which the resilient system interposed between the casing and the above head is a resilient means operating under compression; this windscreen-wiper element comprises a cylindrical articulation provided between the head and the above casing, a helical compression spring bearing, on the one hand, on a member connected to the above head by a shaft parallel to that of the shaft for articulating the head on the casing and, on the other hand, on a part which is rigid with the casing, the said member being conncted to the housing by a connection enabling free sliding; the above member is a plate, the level of which is substantially perpendicular to its shaft for articulation with the head and the central region of which comprises a recess for accomodating a spring; the connection, which ensures that the plate may slide freely with respect to the casing, is provided with means which support the action of the spring and prevent it being moved perpendicular to the plate; the connection which enables the plate to slide freely with respect to the casing is constituted by a slot provided in the curved end of the windscreen-wiper arm which is rigid with the casing.

The windscreen-wiper element described in the above-mentioned French patent application is perfectly satisfactory for the windscreen-wipers of touring vehicles in which the resilient bearing force of the windscreen-wiper on the windscreen is relatively slight. On the other hand, a problem may arise when it is desired to use the device for larger vehicles, owing to the fact that the resilient bearing force to be exerted on the windscreen-wiper arm then becomes very great. In the device advocated with compression means interposed between the drive head and the casing exerts its entire action on the folded end of the windscreen-wiper arm connected to the casing; as the width of the windscreen-wiper arm is still relatively restricted there is the risk of deforming the end, of the windscreen-wiper arm, into a right-angle by the compression means.

The aim of the present invention is to overcome the disadvantage cited above and to propose an improvement to the windscreen-wiper elements described in the French patent application 79-19195. According to this improvement, the compression means interposed between the drive head and the casing exerts its action on a stop bracket which cooperates with projections provided on the internal face of the casing flanges. It has therefore been proposed, according to the invention, to provide on the lateral flanges of the casing stops for supporting the folded end of the arm on which end the force generated by the compression means is exerted.

If the casing is much greater than the windscreen-wiper arm connected thereto, the formation of stops on the lateral flanges of the casing involves very large raised portions being provided at the interior of the said casing; it results therefrom that large hollow regions have to provided which risks giving the windscreen-wiper element an inaesthetic appearance.

It is therefore proposed according to a further feature of the invention to provide a stop bracket constituting an independent part which is positioned in the casing by simple encasing. Thus the depth of the projections may be limited since the width of the bracket may be made substantially equal to the distance between the two lateral flanges of the casing. It results that the above projections may be provided by die-stamping the flanges of the casing without tearing the metal sheet constituting the said flanges, such that the unaesthetic appearance owing to the presence of hollows in the lateral flanges of the casing is avoided. The bracket used as a stop may, moreover, be wedged by one of its elements between the above-mentioned projections and the web of the casing and is then held perfectly in position as soon as the resilient means interposed between the casing and the drive head exerts it action. It may therefore be seen that this formation overcomes all the above-mentioned difficulties: on the one hand, the deterioration of the appearance of the windscreen-wiper is avoided; on the other hand, all risks of deforming the stop of the compression means are avoided; finally, by using an independent bracket which is positioned by simply encasing it in the casing, increases in the cost price of the windscreen-wiper are avoided whilst overcoming the disadvantages involved with large-sized windscreen-wipers and, in particular with windscreen-wipers for heavy vehicles.

Consequently, the present invention relates to the novel industrial product constituted by a windscreen-wiper of a drive mechanism and the armature of a windscreen-wiper, the said element comprising, on the one hand, a head which is fixed on the above-mentioned output shaft, on the other hand, an arm, one end of which bears a means for connection to the windscreen wiper armature mentioned above and the other end of which is mechanically connected to the above head by means of a casing constituted by two flanges connected to one another by a web, the transverse section of the said casing being U-shaped, and finally a cylindrical articulation provided between the head and the above-mentioned casing, a compression means bearing, on the one hand, on a member connected to the above-mentioned head by a shaft parallel to that of the articulation of the head on the casing and, on the other hand, on a part borne by the casing, the said member being connected to the casing by a connection enabling free sliding, characterized in that the part borne by the casing, on which the compression means bears, is a bracket. The first element of the bracket is disposed in a manner substantially perpendicular to the web of the casing and bears at least one opening for the passage of the above member. As the edges of the said first element bear on the projections borne by the said flanges, the second element of the bracket is accommodated between the web of the casing and the region of the above projections, which are nearest the said web.

In a first variant the stop bracket is constituted by the folded end of the arm. In a second variant, the stop bracket is an independent part, the length of which is substantially equal to the distance between the two flanges of the casing, the edges of the first element of the bracket being adjacent the flanges of the casing.

In a preferred embodiment, the member on which the compression means bears is constituted by at least one plate, the level of which is substantially perpendicular to its shaft for articulation with the head, and the compression means is constituted by at least one helical spring, a spring being associated with each plate of the member; it is obvious that the member, on which the compression means bears, may be constituted by a single plate with which there is associated a compression spring, as is the case in the example described in the French patent application 79-19195, or it may be constituted by a plurality of plates parallel to each of which there is a associated a compression spring as is the case in the example described in the present patent application; each plate constituting the member on which the compression means bears comprises in its central region a recess enable the associated spring to be accommodated, the connection, enabling the said plate to slide freely with respect to the casing, being provided with means which support the action of the spring and prevent it being moved perpendicularly to the plate; the second element of the bracket comprises, on its edge opposite the connection zone of the elements, a fold substantially parallel to the first element, the total height of the fold being substantially equal to the distance separating the web of the casing and the projections of the lateral flanges of the casing so as to ensure the wedging of the second element; the projections of the lateral flanges of the casing are obtained by local deformation of the said flanges towards the interior of the casing; each lateral flange of the casing bears internally a single projection, the height of which is less than that of the flange, the said projection stopping at a certain distance from the web of the casing; the section of a projection parallel to the web of the casing is substantially triangular, the raised portion formed by the projection being at its maximum in the zone nearest the shaft which connects the head to the casing; the projections are obtained by die-stamping the casing without tearing the sheet metal of the flanges of the said casing; each plate comprises, in the zone thereof where one end of the spring bears against it, a means for centering the spring with respect to the plate; the centering means may be a projection constituting a raised portion in the recess where the spring is accommodated; the plate recess, where the spring is accommodated, is rectangular, its length being at least equal to the maximum length of the spring in the free state and its width being at least equal to the diameter of the spring; the flanges of the casing bear the shaft for articulation of the head with respect to the casing in the vicinity of their longitudinal edges which are opposite the web of the said casing; the means supporting the action of a spring and associated with the sliding connection of each corresponding plate with respect to the casing, are formed by a small plate with a U-shaped cross-section, the web of which is subject to the action of the spring, bears on the bracket borne by the casing and comprises a slot ensuring that the plate slides freely, and the flanges of which are substantially parallel to the casing flanges; the flanges of the small plate are spaced at a distance substantially equal to or slightly greater than the external diameter of the spring; the assembly head of the windscreen-wiper element comprises a stirrup between the flanges of which there is inserted the end of each plate which is opposite the sliding connection with the casing, a shaft passing through the small plate- stirrup assembly so as to form a cylindrical articulation; the member, on which the compression means bears, bears at least one stop which limits the releasing course of the windscreen wiper with respect to the surface to be wiped, by cooperation with the head; the edge of each plate, which is in the vicinity of the articulation of the plate with respect to the head, constitutes with its two ends two stops limiting the angular deflection of the head about its shaft for articulation with respect to the casing; an anti-buckling guide is arranged inside each spring.

For better comprehension of the subject matter of the invention there will now be described, by way of purely illustrative and non-limiting examples, two embodiments represented on the attached drawing.

In this drawing:

FIG. 1 shows a bottom view of a windscreen-wiper element according to the invention, according to I—I of FIG. 2;

FIG. 2 shows a longitudinal section with the windscreen wiper element of FIG. 1 disengaged, according to II—II of FIG. 1;

FIG. 3 shows a perspective view of the independent stop bracket on which the force of the compression means in the embodiment of FIGS. 1 and 2 is exerted;

FIG. 4 shows a perspective view of a variant of an embodiment of the bracket, in which this bracket is formed by the end of the arm.

With reference to the drawing, and in particular to FIGS. 1 to 3, it may be seen that the windscreen-wiper element according to the invention comprises a windscreen-wiper arm 1, which is connected to an assembly head 2 by means of a casing designated 3 in its entirety. The region of the assembly head 2 is covered by a cover 30 which is articulated with respect to the casing 3 by means of two half-shafts 31 which are able to slide in the slots 32 of the casing 3. The arm 1 is made rigid with the casing 3 by means of two rivets 4.

The casing 3 has a U-shaped transverse section: it is constituted by two substantially parallel flanges 3a connected to one another by a web 3b. The flanges 3a of the casing 3 bear the shaft 7 for articulation of the head 2 with respect to the casing. The shaft 7 is arranged in a perpendicular manner to the flanges 3a in the region of these flanges which is furthest, on the one hand, from the arm 1 and, on the other, from the web 3b. The head 2 comprises a sleeve 8 provided with a bore, through which the shaft 7 passes. At one of its ends the shaft 7 comprises a hemispherical head 7a and is flattened by crimping at its other end 7b, in order to ensure that it is maintained in position. On the sleeve 8 there is connected a stirrup constituted by two yokes 81, 82; each yoke 81, 82 is formed by two parallel flanges 9 between which there is disposed one end of a plate 10 have a generally substantially rectangular shape. The connection between the plate 10 and the flanges 9 is produced by means of a shaft 11 which forms a cylindrical articulation between the plate 10 and the head 2. The head 2 comprises a bore 2a for positioning the head on the drive shaft (not shown) of the windscreen-wiper element; the drive shaft is alternately rotated by a suitable mechanism. The fixing of the head on its drive shaft is produced by means of a nut which is screwed onto the end of the shaft. As is clearly visible in the drawing, the shaft 11 and the bore 2a are arranged either side of the plane passing through the shaft 7 and perpendicular to the web 3b.

The web 3b is limited on the side of the shaft 7 by a transverse edge 3c arranged approximately on the right of the shaft 11. The cover 30 enables the deflection of the head 2 with respect to the casing 3 and the positioning of the assembly nut which fixes the head 2 on its drive shaft; in addition, the cover 30 covers the cylindrical articulations which correspond to the shafts 7 and 11 and are not covered by the web 3b which is interrupted at the level of the transverse edge 3c.

The two plates associated with the two yokes 81 and 82 are exactly the same. Each plate 10 has one of its ends articulated about a shaft 11 and its other end is engaged in a slot 6 provided in a stop bracket designated 5 in its entirety. The stop bracket 5 comprises a first element 5a in which two identical slots 6 are provided, parallel shafts, and a second element 5b which terminates in a fold 5c provided along that edge of the element 5b which is opposite the connection region of the two elements 5a and 5b. The fold 5c is therefore substantially parallel to the element 5a of the bracket 5. The flanges 3a of the casing 3 comprise two stampings resulting in projections rising between the flanges of the casing 3. Each flange 3a bears a projection 50; the two projections 50 are identical: in a section through a plane parallel to the web 3b of the casing 3, they have a triangular shape, the maximum of the raised portion being arranged on the side where the shaft 11 is located. The stamping, owing to which the projections 50 are formed, is performed so as to avoid the formation of hollow portions by tearing the sheet metal forming the flanges 3a of the casing 3. The projections 50 extend over a height lower than the height of the flanges 3a and they each have the shape of a right prism with a triangular base, the edges of which are perpendicular to the web 3b of the casing 3. The projections 50 are not provided up to the plane of the web 3b and, between the projections 50 and the web 3b, there is a passage where the second element 5b of the bracket 5 is positioned. The height of the fold 5c is such that the bracket 5 is wedged, owing to the fold 5c, between the web 3b and the adjacent edge of the projections 50. The first element 5a of the bracket 5 bears, with its two edges adjacent the flanges 3a of the casing 3, on the faces of the maximum raised portion of the projections 50.

Each plate 10 comprises in its central region a rectangular recess 12, the large axis of which is arranged parallel to the long side of the plate 10. On the short side of the recess 12, which is nearest the shaft 11, there is provided a projection 13 constituted by a triangular point which forms a raised portion in the recess 12. Inside the recess 12 there is arranged a helical spring 14 acting under compression. The length of the recess 12 is substantially equal to the length of the spring 14 in the rest state; the width of the recess 12 is substantially equal to the external diameter of the spring 14. The projection 13 enables the spring 14 to be centered in the recess 12; but it is very clear that, at the end of the recess 12 which is opposite the projection 13, the spring is not maintained perpendicular to the plane of the plate 10. The end of the spring 14, which is not centered on the projection 13, bears on the web of a small plate 15, which has a U-shaped transverse section: the small plate 15 comprises two parallel flanges 15a connected to one another by a web 15b arranged perpendicular to the plate 10. The plate 10 passes through the web 15b owing to a slot 15c provided in the web 15b. The webs 15b of the two small plates 15 associated with the two springs 14 are urged so as to bear against the first element 5a of the bracket 5. The flanges 15a of the small plates 15 are spaced at a distance substantially equal to the external diameter of the spring 14, such that they lock the said spring 14 in position in the direction perpendicular to the plate 10.

The springs 14 operate under compression and develop a force between the first leg 5a of the bracket 5 and the articulation shaft 11; this force provides a torque which, assuming that the head 2 is fixed since it is made rigid with the drive shaft, tends to cause a rotation of the arm 1 in the direction indicated by the arrow F in FIG. 2. This torque is such that it allows the blade of the windscreen-wiper to be applied against the windscreen while the windscreen-wiper is in operation. The region 10a of the edge of the plate 10 which is in the vicinity of the shaft 11 forms a stop limiting the angular deflection of the head 2 with respect to the casing 3 in the direction of the arrow F, whilst the region 10d of this edge forms a stop limiting the angular deflection of the head in the opposite direction; the region 10b acts as a stop when the user wishes to disengage the windscreen-wiper with respect to the windscreen. As has already been disclosed in the French patent application 79-19195, when the user disengages the windscreen-wiper with respect to the windscreen and causes the edge 10b to abut against the sleeve 8, a flexion force is exerted on the part 10 which is the greater, the more fierce the action of the user and the greater the force of the springs, which at this moment is added to that of the user. The part 10 has great resistance to the flexion since it has been provided with a great height by arranging it either side of the spring 14; as this part 10 is arranged externally of the spring 14 it may easily have an increased thickness, if this should prove necessary. This structure enables all deformation owing to flexion when the arm of the windscreen-wiper is disengaged with respect to the windscreen to be avoided.

In order to prevent buckling of the spring 14 there is arranged inside this spring a guide formed by a rod 16 with a circular section, the said rod having a diameter very slightly smaller than the internal diameter of the spring 14. During the relative movement of the casing 3 with respect to the head 2, the plate 10 moves with respect to the casing 3 and slides freely through the slots 15c of the small plate 15 and the slots 6 of the element 5a of the bracket 5. During these movements, the inclination of the center line of the plate 10, that is the axis of the spring 14 with respect to the web 3b of the casing 3, varies slightly.

The windscreen-wiper element according to the invention is easy to produce since the parts 5, 10 and 15 may be obtained simply by stamping metal sheets. In addition, this windscreen-wiper element is mounted easily: firstly the arm 1 and the casing 3 are assembled by riveting; then the head 2 and the plates 10 are assembled by means of the shafts 11; subsequently the springs 14 and their anti-buckling guides 16 are positioned in the recesses 12 and the small plates 15 are arranged at the ends of the springs 14 which do not move onto the projections 13, by sliding the plates 10 in the slots 15c. The bracket 5 is positioned in the casing 3 by sliding the element 5b between the projections 50 and the web 3b of the casing 3, until the element 5a bears against the projections 50. Subsequently the free ends of the two plates are engaged in the two slots 6 of the element 5a of the bracket 5 and the springs 14 are compressed by pushing on the shaft 11 until the bore of the sleeve 8 faces the openings provided in the flanges 3a for the shaft 7; the shaft 7 is then positioned, which ensures that the assembly is rigid.

As the mounting and the manufacture of the windscreen-wiper element according to the invention are simple, the said element has an advantageous cost price although it enables all deterioration by deformation to be avoided; the use of a bracket 5 independent of the windscreen-wiper arm 1 enables projections 50 to be produced which make a slight raised portion since the element 5a bears on the projections over a great length; in addition, the bracket 5 may be made from relatively thick sheet metal and the forces which are exerted on the element 5a are transferred to the bearing of the bracket 5 without any deformation of the said bracket. Finally it should be noted that the positioning of the bracket by simple encasing does not involve any increase in the cost price owing to the simplicity of the operation.

FIG. 4 shows a perspective view of a further variant of the embodiment of the stop bracket: in this variant, this bracket is formed by a right-angled folding of the end 500 of the arm 100 of the windscreen-wiper; this end 500 comprises two slots 600 identical to the slots 6 in the embodiment in FIGS. 1 to 3. The arm 100 is mounted in the place of the arm 1 and the stop bracket 500 bears against the projections 50 of the casing. All the other elements of this variant are the same as for the embodiment in FIGS. 1 to 3.

It is understood that the embodiments described above are in no way limiting and may give rise to any modifications desired without departing from the scope of the invention.

I claim:

1. A windshield wiper arm for connection between the output shaft of a wiper drive mechanism and a windshield wiper, said wiper arm comprising, a head adapted to be fixed on the output shaft, a U-shaped casing pivotally connected to said head for pivotal movement about an axis transverse to the drive shaft so that said casing can pivot toward and away from a windshield to be wiped by the windshield wiper, said U-shaped casing comprising a web and side flanges projecting from the web, a bracket extending between said flanges, compression means between said bracket and said head, means pivotally connecting one end of the compression means to said head for pivotal movement about an axis parallel to said transverse axis, said compression means engaging said bracket and exerting a force on the casing in a direction to cause the casing to pivot toward the windshield, said bracket being generally perpendicular to the direction of the force exerted by the compression means, and abutment means for preventing movement of the bracket under the action of the compression means, and for transmitting the force of the compression means to the casing, said abutment means comprising projections deformed inwardly of the casing from said flanges, said projections engaging opposite sides of said bracket.

2. Windshield wiper arm according to claim 1 wherein said bracket comprises an L-shaped bracket.

3. Windshield wiper arm according to claim 1 wherein said bracket is of a width substantially equal to the distance between said flanges of the casing and side edges of the bracket are adjacent the flanges of the casing.

4. Windshield wiper arm according to claim 1 wherein said compression means comprises at least one plate, the plane of which is substantially perpendicular to the axis of its pivot means, and at least one helical spring.

5. A windshield wiper arm according to claim 4 wherein each plate has a central recess for receiving said compression spring, each plate extends through a slot in said bracket, and means to prevent movement of the compression spring transverse to the plate.

6. Windshield wiper arm according to claim 3 wherein said projections are each spaced from said web of the casing, one leg of said L-shaped bracket is parallel to the web of the casing, a tab at the end of said one leg, the height of said tab being substantially equal to the distance between the web of the casing and said projections, so that said bracket is retained in said casing by said projections.

7. Windshield wiper arm according to claim 1 wherein there is only a single projection on each flange which engages said bracket.

8. Windshield wiper arm according to claim 1, wherein the section of each projection in a plane parallel to the web of the casing is substantially triangular, and the maximum inwardly deformed portion of the projection is closest to and faces toward said head.

9. Windshield wiper arm according to claim 1 wherein each projection is formed by stamping the casing to form indentations without tearing the sheet metal of the flanges.

10. Windshield wiper arm according to claim 1 wherein said bracket comprises bent sheet metal.

11. Windshield wiper arm according to claim 4 wherein each plate comprises means for centering the spring with respect to the plate.

12. Windshield wiper arm according to claim 11 wherein the centering means comprises a projection at one end of a recess in the plate for receiving the spring.

13. Windshield wiper arm according to claim 5 wherein the recess of the plate is rectangular and of a length at least equal to the maximum length of the spring in a relaxed condition, and of a width at least equal to the diameter of the spring.

14. Windshield wiper arm according to claim 1 wherein the U-shaped casing is pivotally connected to the head by a pin which extends through the casing at a location remote from the web of the casing.

15. Windshield wiper arm according to claim 1 further comprising a U-shaped plate having a slot for receiving the spring accomodating plate, said U-shaped plate being between the adjacent end of the spring and the bracket and providing a seat for the spring.

16. Windshield wiper arm according to claim 15 wherein the legs of the U-shaped plate are spaced apart a distance substantially equal to the external diameter of the spring.

17. Windshield wiper arm according to claim 4 wherein said means for pivotally connecting one end of the compression means to the head comprises a stirrup into which an end of a plate is inserted, and a shaft extending through the stirrup.

18. Windshield wiper arm according to claim 4 further comprising stop means to limit the extent of pivotal movement of the casing away from the windshield to be wiped.

19. Windshield wiper arm according to claim 18 wherein said stop means comprises a surface of said head an an end edge of a plate for retaining the spring.

20. Windshield wiper arm according to claim 4 further comprising an anti-buckling guide within each compression spring.

* * * * *